UNITED STATES PATENT OFFICE.

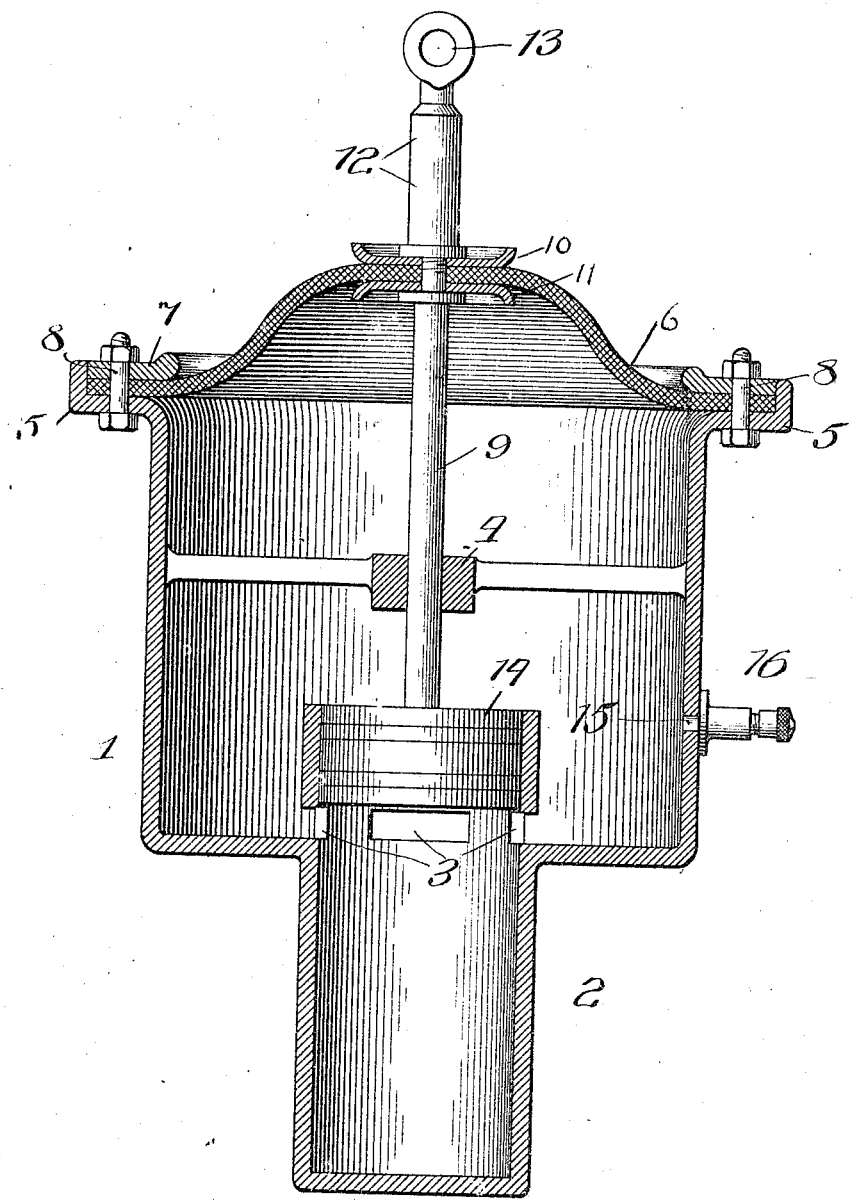

FRANK W. MILLS, OF CHICAGO, ILLINOIS, ASSIGNOR OF ONE-HALF TO H. S. MILLS, OF CHICAGO, ILLINOIS.

PNEUMATIC VEHICLE-SPRING.

991,165.  Specification of Letters Patent.  Patented May 2, 1911.

Application filed August 1, 1910. Serial No. 574,858.

*To all whom it may concern:*

Be it known that I, FRANK W. MILLS, a citizen of the United States, residing at Chicago, in the county of Cook and State of Illinois, have invented a new and useful Improvement in Pneumatic Vehicle-Springs, of which the following is a specification.

My invention relates to an improvement in the class of pneumatic springs for resiliently supporting the body of a car, automobile or other vehicle, in which a chamber for confining air under pressure is covered by a flexible diaphragm carrying a piston and adapted to carry the load.

The primary object of my improvement is to provide a construction of pneumatic spring in the class referred to, by which the normal air-pressure confined within the chamber shall suffice to resiliently support, through the medium of the diaphragm, the vehicle-body and the load carried by it under ordinary conditions, and whereby abnormal conditions under increased load or excessive jolting shall cause the piston to proportionately augment the pressure of air in the chamber and thus reinforce the diaphragm.

The accompanying drawing illustrates my improvement in its preferred form of embodiment by a view in vertical sectional elevation.

An air-chamber 1, of suitable dimensions and shape, has a relatively narrow supplemental chamber 2 extending through one end to some distance beyond the inner surface of that end, adjacent to which it is provided with a suitable number of openings 3 through which to afford free communication between the wider and narrower chamber-sections in the normal operative condition of the device. The supplemental chamber, which affords a compressed-air cylinder, is closed at its outer end and open at its inner end. The wider chamber-section, which contains a central guide-bearing 4, has formed about its open end a seating-flange 5 for the edge-portion of a flexible diaphragm 6 of suitable elastic material, secured in place, to render the chamber air-tight, by a ring 7 fastened by bolts 8 passed at intervals through the ring and flange-base and the portion of the diaphragm confined between them. A piston-rod 9 extends in the chamber 1 through the bearing 4 from the center of the diaphragm and is shown to penetrate the latter, being secured by clamping-plates 10 and 11 confined upon it against opposite surfaces of the diaphragm. The drawing shows an outer extension 12 of the piston-rod, terminating in an eye 13 as means for connecting the device with the under part of a vehicle-body (not shown). The rod 9 carries on its inner end a piston 14 to work in the cylinder 2.

As will be understood, a plurality of these pneumatic springs is required for supporting any vehicle-body, as that of an automobile, for example, and for which use I have more immediately devised my improvement. With the device in place, it is charged with compressed air, as through an opening 15 equipped with a valve 16, which may be like that commonly used for automobile-tires. The pressure of air introduced into and confined in the chamber should be sufficient to expand the diaphragm to the condition in which it is represented and reinforce it against undue depression from that condition under the normal conditions referred to of the vehicle-body. By way of suggestion, the air-pressure thus confined may be regarded as one hundred pounds to the square inch. Then, in the travel of the vehicle, this normal pressure in the chamber will support a degree of depression of the diaphragm that will introduce the piston into the cylinder to an extent that would cause the piston to close or pass the openings 3. Severe jolting of the vehicle, or material increase in the load, will depress the piston into the cylinder and close communication of the latter through the openings 3 with the wider chamber-section, thereby confining and further compressing the air in the cylinder in proportion to the severity of the jolt or degree of increase in the load, with the effect of cushioning the weight by correspondingly reinforcing the diaphragm, which is thus relieved of tendency to give way or burst under abnormal stresses when subjected thereto and will always perform its resilient cushioning function in a desirable manner, as to the matter of lending comfort in riding in the vehicle. When the cause of the abnormal depression of the piston subsides or is removed, the diaphragm will operate only against the normal degree of air-pressure in the device. As will therefore be observed, the spring action of my improved device never varies materially with varying conditions to which the vehicle-body is subjected.

What I claim as new and desire to secure by Letters Patent is—

1. In a pneumatic spring, the combination of a compressed-air chamber having a relatively wide section, and a narrower section closed at its outer end, a flexible diaphragm covering said chamber and normally sustained by uniform pressure in both sections thereof, and a piston carried by the diaphragm to work in the narrower chamber-section and normally held by the diaphragm out of compressing engagement with said narrower section, for the purpose set forth.

2. In a pneumatic-spring, the combination of a compressed-air chamber comprising a relatively wide section with a narrower section extending from one end and closed at its outer end, a flexible diaphragm covering said chamber and normally sustained by the uniform pressure in both sections thereof, a piston-rod extending from the diaphragm, and a piston on the rod to work in the narrower chamber-section and normally held by the diaphragm out of compressing engagement with said narrower section, for the purpose set forth.

3. In a pneumatic spring, the combination of a compressed-air chamber comprising a relatively wide section having a narrower section extending through one end, the narrower section being closed at its outer end and provided with openings in its wall within the wider section, a flexible diaphragm covering the chamber, a piston working in the narrower section, and a rod carrying the piston and extending from the diaphragm, for the purpose set forth.

4. A pneumatic spring comprising, in combination, a compressed-air chamber having a relatively narrower central extension forming a cylinder closed at its outer end and extending within the chamber, being provided therein in its wall with openings, a flexible diaphragm covering the chamber, a central guide-bearing in the chamber, a piston working in the cylinder, and a rod carrying the piston on one end and secured at its opposite end to the center of the diaphragm, for the purpose set forth.

FRANK W. MILLS.

In the presence of—
R. A. RAYMOND,
R. A. SCHAEFER.